May 31, 1955  P. WEINBERGER  2,709,483
BUCKET BACK SEAT WITH SINUOUS SPRING
Filed Oct. 26, 1951  3 Sheets-Sheet 1

INVENTOR.
Paul Weinberger.
BY
Harness, Dickey & Pierce
ATTORNEYS.

May 31, 1955  P. WEINBERGER  2,709,483
BUCKET BACK SEAT WITH SINUOUS SPRING
Filed Oct. 26, 1951  3 Sheets-Sheet 2
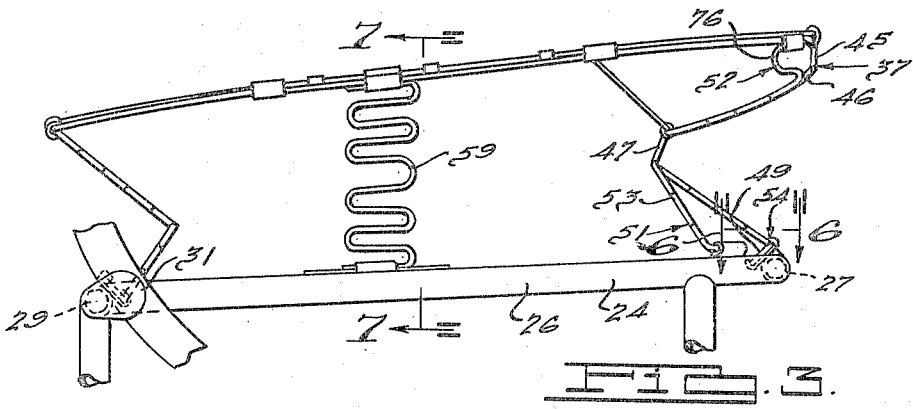
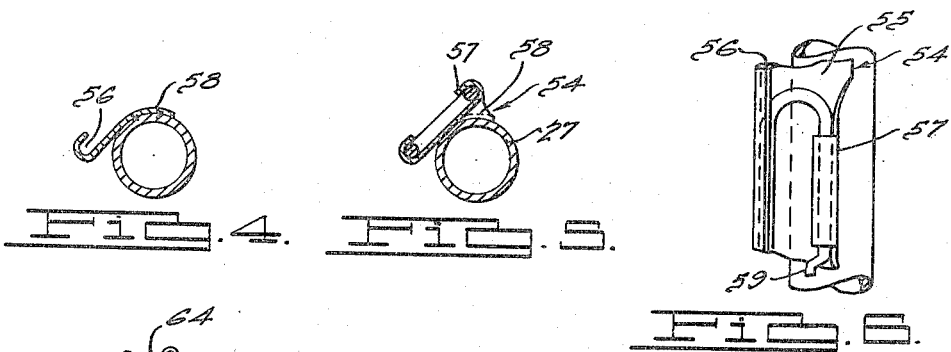
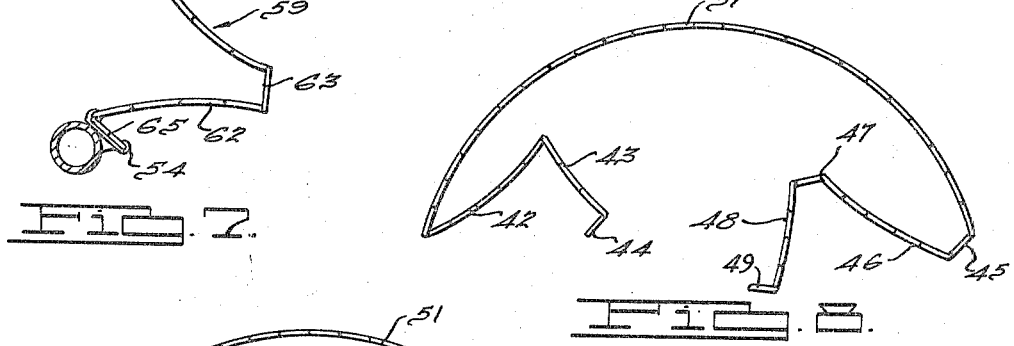
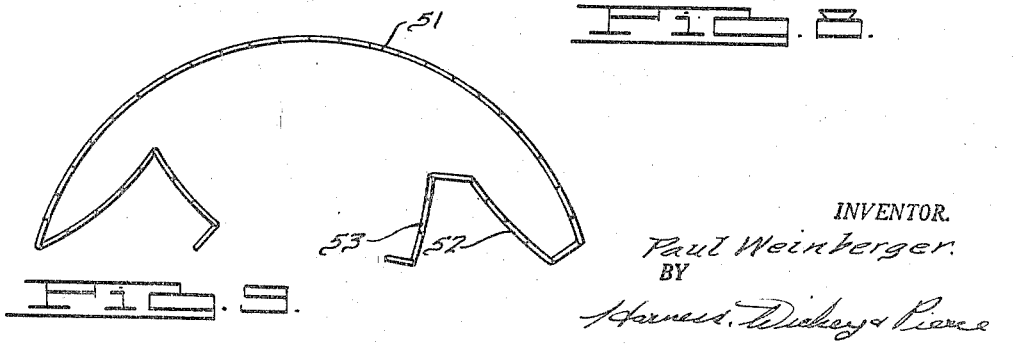
INVENTOR.
Paul Weinberger.
BY
ATTORNEYS.

May 31, 1955  P. WEINBERGER  2,709,483
BUCKET BACK SEAT WITH SINUOUS SPRING
Filed Oct. 26, 1951  3 Sheets-Sheet 3
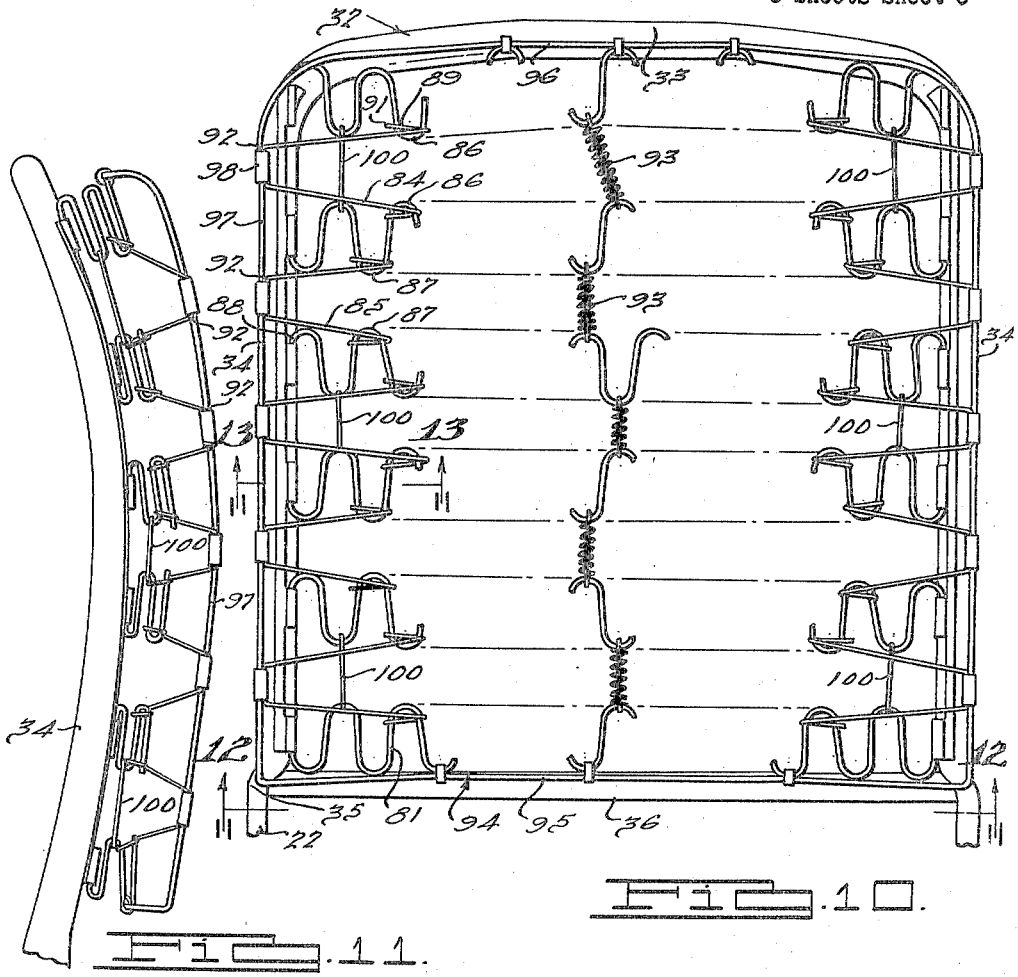
FIG. 10.
FIG. 11.
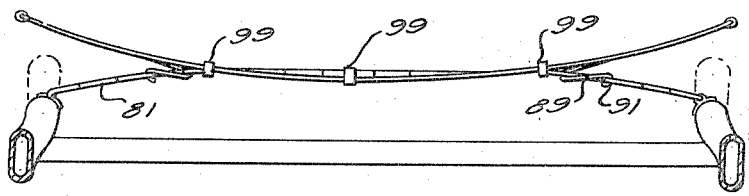
FIG. 12.
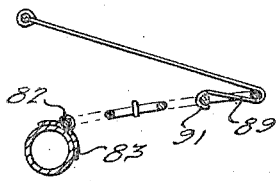
FIG. 13.
INVENTOR.
Paul Weinberger.
BY
Harness, Dickey & Pierce
ATTORNEYS.

United States Patent Office 2,709,483
Patented May 31, 1955

2,709,483

BUCKET BACK SEAT WITH SINUOUS SPRING

Paul Weinberger, Garden City, Mich., assignor to No-Sag Spring Company, Warren Township, Mich., a corporation of Michigan Application October 26, 1951, Serial No. 253,328

4 Claims. (Cl. 155—179)

This invention relates to vehicle seats, and particularly to a vehicle seat of the bucket type, the cushion elements of which are constructed from sinuous type of spring strips.

The main objects of the invention are: to provide an assembly of sinuous spring strips for a seat cushion which is attachable to a frame member within the frame area; to form an assembly of spring strips which have a load supporting portion terminating in V-end supporting portions, the ends of which are reversely bent and secured on the inside of the supporting frame; to form an assembly of spring strips laterally across the back frame to which a border wire which curves outwardly from the center to the sides is secured at the top and bottom and supported at the edges by spring elements secured to the spring strips to form a laterally, arcuately shaped surface of a bucket seat, and, in general, to provide a seat and back cushion assembly from spring strips to form a bucket type of seat which is simple in construction and economical of manufacture.

Other objects and features of novelty of the invention will be specifically pointed out or will become apparent when referring, for a better understanding of the invention, to the following description taken in conjunction with the accompanying drawings, wherein:

Fig. 3 is a broken, elevational view of the structure illustrated in Fig. 2, as viewed from point 3 thereof;

Fig. 4 is an enlarged sectional view of the structure illustrated in Fig. 2, taken on the line 4—4 thereof;

Fig. 5 is an enlarged sectional view of the structure illustrated in Fig. 2, taken on the line 5—5 thereof;

Fig. 6 is an enlarged, broken sectional view of the structure illustrated in Fig. 3, taken on the line 6—6 thereof;

Fig. 7 is an enlarged, sectional view of the structure illustrated in Fig. 3, taken on the line 7—7 thereof;

Fig. 8 is a view of a sinuous spring strip as employed in the central portion of the spring assembly;

Fig. 9 is a view of a spring strip employed along the side edges of the spring assembly;

Fig. 10 is an enlarged view in elevation of the spring assembly for the back cushion, as viewed from the point 10 of Fig. 1;

Fig. 11 is a view in side elevation of the structure illustrated in Fig. 10;

Fig. 12 is a sectional view of the structure illustrated in Fig. 10, taken on the line 12—12 thereof, and Fig. 13 is an enlarged sectional view of the structure illustrated in Fig. 10, taken on the line 13—13 thereof.

Figures 1, 2:
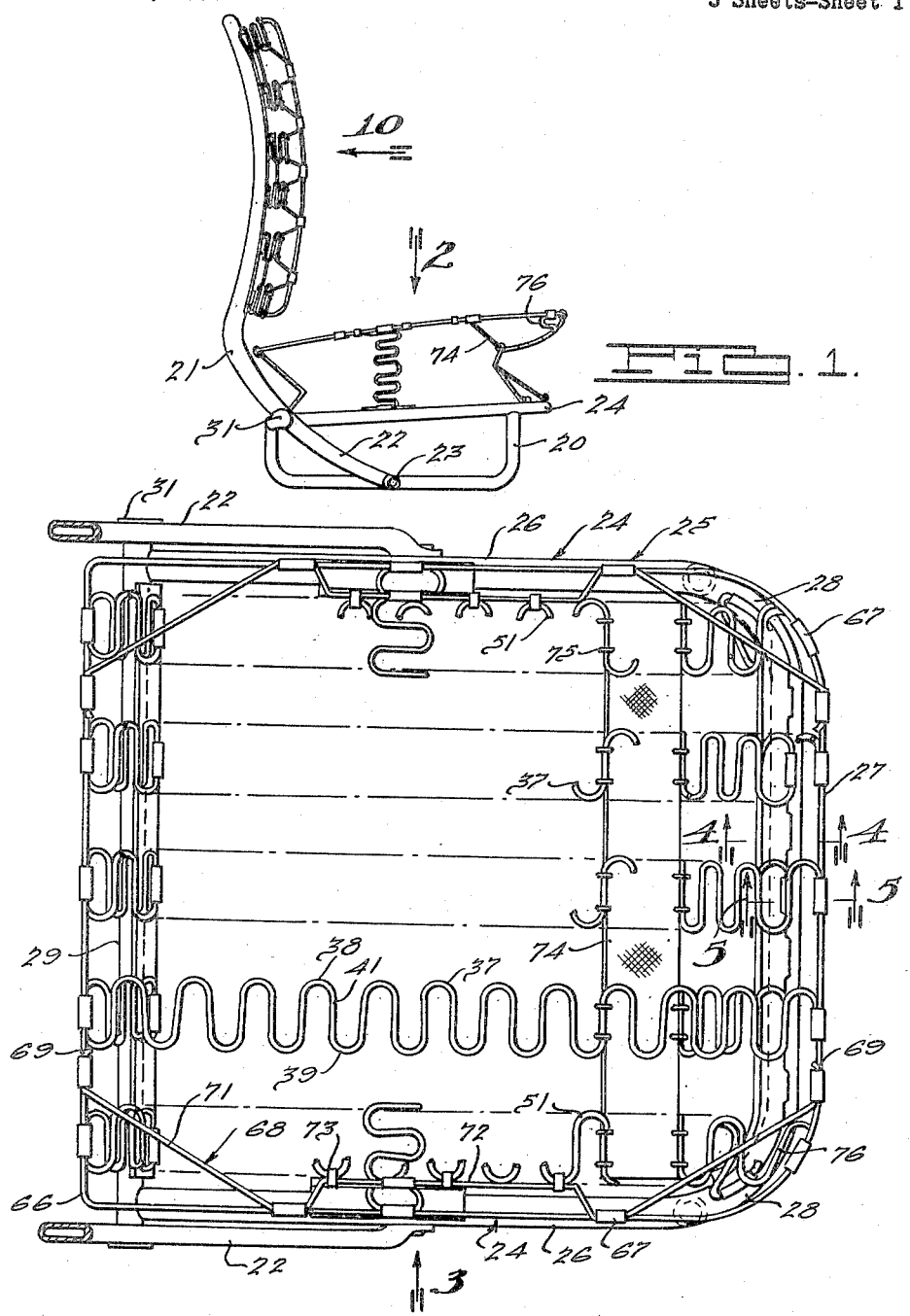
Figure 1 is a side view in elevation of a seat frame having seat and back cushion spring assemblies mounted thereon.
Fig. 2 is an enlarged plan view of the spring assembly for the seat unit, as viewed from point 2 of Fig. 1.

In Fig. 1 a bucket type seat is illustrated, embodying a tubular base frame 20, having a back frame 21 provided with extending arms 22 which are pivoted at 23 to the base of the base frame 20. A cushion supporting frame 24 of the base frame 20 is of rectangular shape. The frame 24 is made of a U-shaped tubular element 25 having side arms 26 and a front section 27 joined by arcuate corner sections 28. The rear ends of the arm 26 are interconnected by a tubular element 29 which extends beyond the arm portion 26 against which the extending arms 22 of the back frame rest when in seating position. The ends of the tubular element 29 are flattened and extended forwardly to form embossments 31 which prevent the lateral shifting of the back frame relative to the seat frame.

The arms 22 of the back frame extend from a U-shaped frame element 32 having a laterally extending top portion 33 and downwardly extending arm portions 34 from which the arms 22 are in continuation at an offset portion 35. A tubular cross bar 36 extends between the arms 34 of the back frame and is joined thereto at the offset portion 35.

A plurality of sinuous spring strips 37, as illustrated in Fig. 8, are employed centrally of the spring assembly for the seat cushion, as illustrated in Fig. 2. These units are made of wire bent back and forth in sinuous form, having oppositely disposed loops 38 and 39 joined by straight portions 41. An arch is provided in the spring strip, as illustrated in Fig. 8, with the rear ends reversely bent at 42, again reversely bent at 43, and further reversely bent at 44, as illustrated in the figure. The forward end of the spring strip has a loop 45 reversely bent therefrom from which a section 46 is reversely bent, with a loop 47 bent therefrom and a section 48 bent from the loop from which an end loop 49 is reversely bent. The loops 45 and 47 provide a greater resistance to fatigue at points where the greatest amount of torsion occurs.

The spring strips 51 illustrated in Fig. 9 are employed at the side edges of the spring assembly, as illustrated in Fig. 2. The spring strips 51 are the same as the spring strips 37 with the exception that the length of the arm 52 is less than the length of the arm 46 and the length of the arm 53 is less than the length of the arm 48. This difference in length is desirable, as a shorter length is required for the end springs due to the arcuate corner portions 28 of the frame member, as is evident from viewing the structure of Figs. 1 and 3.

In Fig. 5 it will be noted that a formed strip of sheet metal 54 is attached to the front and rear frame member portions 27 and 29 on the inner side thereof. The strip embodies a flat web portion 55 having the inner edge thereof reversely bent to form a channel 56 and having spaced tabs 57 reversely bent from the opposite edge to form channels facing the channel 56. Spaced channels formed by the tabs 57 are located to be in alignment with the spring locations across the frame. The portions of the strip intermediate the tabs 57 are deflected in the opposite direction and are of arcuate shape, as illustrated at 58 in Fig. 5, to follow the curvature of the tubular frame members 27 and 29 so as to be readily welded thereto in unit relation.

The endmost loops 44 and 49 of the spring strips 37 and 51 are inserted with a sideward motion into the channel element 56 and the opposite channels formed by the tabs 57. Thereafter, the tabs 57 are bent downwardly over the engaged spring strip portion, the ends of which are offset, as illustrated at 59 in Figure 6, to prevent the spring from moving laterally from secured position. By mounting the endmost loops 44 and 49 inwardly of the center of the tubular elements 27 and 29, interference with the trimming of the seat cushion is eliminated as the trim material is drawn directly around the tubular frame element 24.

The spring 51 has the central seating portion thereof supported at the side edges by the spring units 59, having a V-shaped portion made up of arm sections 61 and 62 joined by a vertically disposed loop 63, the upper end having a horizontally disposed loop 64, the bottom end having an angularly disposed loop 65. The angularly disposed loop 65 is supported in a channel portion of a strip 54 in the same manner as illustrated in Fig. 6.

A border wire 66 surrounds the seating portion of the spring assembly, as clearly illustrated in Fig. 2, being the same shape but slightly larger than the frame member 24. The border wire is secured to the endmost straight portions of the seating sections of the spring strips by suitable bands 67. The sidemost spring strips 51 are secured to a formed wire 68 having end portions 69 which are secured to the forward and rearward portions of the border wire and having angular corner portions 71 which are joined to the side portion of the border wire by bands 67 and which are extended inwardly to provide a straight portion 72 adjacent to the sidemost loops of the spring strips 51 to which they are secured by suitable banding rings 73. The border wire unites the springs into a unit, causing the load supporting portion thereof to deflect as a unit when a load is applied thereto.

A listing strip 74 of fabric is secured to the topmost straight portions of the rear loops 47 of the spring strips and to straight portions of the load carrying portion of the spring strips by hog rings 75. The listing strip assures the movement of the V-shaped front end portion to occur in unison with deflection of the seating portion of the spring assembly and aids in controlling the contour thereof when loaded and unloaded. The top loop 64 of the spring element 59 at the sides of the assembly is connected to the straight portion 72 of the formed spring 68 and aids in preventing the rocking of the strip 59 when the seat is loaded, to thereby provide a greater resistance against downward deflection at the side edges of the assembly. It will be noted that the front corner portions of the springs 51 have the loops 76 thereof distorted to follow the curvature of the front corner portions of the border wire.

Referring to Figs. 1, 12 to 13, a plurality of arched sinuous spring strips 81 have the ends secured in tunnel portions 82 of strips 83 which are of arcuate section to conform to the arcuate shape of the side members 34 to which the strips are welded. The ends of the springs are permitted to pivot within the tunnel portions and the springs thus assembled form the main load supporting portion for the cushion. The spaces between the spring strips at each end thereof and above the frame members 34 are spanned by U-shaped spring elements 84 and 85 which are alternately arranged. The elements 84 are longer than the elements 85 as they are connected to the adjacent loops 86 of the adjacent strips, while the shorter elements 85 are connected to the adjacent loops 87 which are closer to the end of the strips than the loops 86. This arrangement obtains by alternately presenting the straight end portions 88 of adjacent spring strips upwardly and downwardly, as clearly illustrated in Fig. 10. Each end of the spring elements 84 and 85 is reversely bent at 89, with the end 91 reversely bent therefrom to have the portions 89 and 91 hook under and over adjacent straight portions connecting the loops 86 and 87 of the strips. In this manner, the end web 92 of each of the elements 84 and 85 extends a substantial amount above the frame members 34 so as to provide a soft edge to the sides of the seat assembly and an arcuate surface laterally thereacross.

It will be noted in Fig. 11 that the frame members 34 are of convex shape, as viewed from the front, to provide a bucket seat which curves laterally from the center outwardly near the edges and which curves from the bottom rearwardly at the top. The central portion of the spring strips is connected by coil springs 93 to produce a united action to the spring strips when loaded, and a border wire 94 surrounds the spring assembly. The bottom portion 95 and the top portion 96 of the border wire are arched from the center outwardly so as to have the side portions 97 aligned with the webs 92 of the elements 84 and 85 when secured thereto by clamping bands 98. When padding and upholstery material is applied to the assembly, the bucket seat back is formed which encompasses the body laterally due to the lateral convex shape thereof and which produces progressive loading of the back portion of the occupant when leaning backward against the back cushion due to the rearward arch of the side frame members 34. The arcuate top and bottom portions 96 and 95 of the border wire are secured to the bottom and topmost spring strips 81 by the clamping bands 99. Wire clips 100 are employed for joining the loops of adjacent pairs of springs 81 which have the ends thereof presenting toward each other so as to prevent the ends of the strips from moving out of the tunnels after assembly.

The bucket type of seat thus provided is rugged of construction and is extremely comfortable as the seating portion is supported at the rear, front and side edges by V-shaped spring sections to provide a desirable support which is resilient and which permits the top surface to assume a more desirable contour for comfort. The rear cushion assembly provides a base spring support which arches rearwardly so that the support is picked up by the back of the occupant as it is leaned thereagainst, encompassed by the soft edge side portions which arch forwardly from the central portion at each side thereof. The seat assembly is entirely self-contained, and the back section is so mounted as to be pivoted forwardly of the seat section to provide entrance room rearwardly thereof for an occupant into the rear compartment of a vehicle.

What is claimed is:

1. In a spring cushion construction, a base frame having laterally extending front and rear portions, channel elements on the base frame disposed in diverging relation when supported on the inner side of the front and rear portions of the frame, sinuous spring strips having front and rear V-shaped supporting portions, and an end loop extending angularly from the ends of the V-shaped supporting portions which are secured by the channel elements inwardly of the center of each of the frame portions.

2. In a seat cushion construction, a frame of tubular material having a cylindrical cross section, a plurality of spring strips disposed across said frame, a securing strip for said spring strips embodying a web portion having an inwardly facing channel along one edge, the opposite edge having spaced inwardly facing channel sections spaced by rearwardly curved sections, said rearwardly curved sections mating with the inner face of the tubular frame when secured thereto, said channel sections supporting the spring strip ends inwardly of the outer face of the frame.

3. A bucket type seat assembly embodying a base frame and a back frame disposed in predetermined relation to each other, channel elements on the base frame disposed in angular relation to each other on the inner side of the front and rear portions of the frame, sinuous spring strips extending from the front to the rear of the assembly having front and rear V-shaped supporting portions, an end loop extending angularly from the V-shaped supporting portions which is secured by the channel elements inwardly of the center of each of the frame elements thereof, a spring assembly for the back frame comprising sinuous spring strips secured laterally across the frame, and spring elements secured to the strips inwardly of the ends thereof to extend forwardly of the frame.

4. A bucket type seat assembly embodying a base frame and a back frame disposed in predetermined relation to each other, channel elements on the base frame disposed in angular relation to each other on the inner side of the front and rear portions of the frame, sinuous spring strips extending from the front to the rear of the assembly having front and rear V-shaped supporting portions, an end loop extending angularly from the V-shaped supporting portions which is secured by the channel elements inwardly of the center of each of the frame elements thereof, a spring assembly for the back frame comprising sinuous spring strips secured laterally across the frame, spring elements secured to the strips inwardly of the ends thereof to extend forwardly of the frame, and a border wire extending around the end of the last said spring elements having top and bottom arcuate portions to provide a concave surface to the front of the assembly.

References Cited in the file of this patent

UNITED STATES PATENTS

| | | |
|---|---|---|
| 2,399,563 | Neely | Apr. 30, 1946 |
| 2,439,789 | Bank | Apr. 20, 1948 |
| 2,526,184 | Williams et al. | Oct. 17, 1950 |
| 2,551,800 | Hopkes | May 8, 1951 |